(12) United States Patent
Deng (10) Patent No.: US 11,892,674 B2
(45) Date of Patent: Feb. 6, 2024

(54) PRODUCTION METHOD OF BACKLIGHT PLATE, BACKLIGHT PLATE, AND BACKLIGHT MODULE

(71) Applicant: TCL CHINA STAR OPTOELECTRONICS TECHNOLOGY CO., LTD., Guangdong (CN)

(72) Inventor: Tong Deng, Guangdong (CN)

(73) Assignee: TCL CHINA STAR OPTOELECTRONICS TECHNOLOGY CO., LTD, Guangdong (CN)

( * ) Notice: Subject to any disclaimer, the term of this patent is extended or adjusted under 35 U.S.C. 154(b) by 29 days.

(21) Appl. No.: 17/621,716

(22) PCT Filed: Dec. 10, 2021

(86) PCT No.: PCT/CN2021/137052
§ 371 (c)(1),
(2) Date: Dec. 22, 2021

(87) PCT Pub. No.: WO2023/092692
PCT Pub. Date: Jun. 1, 2023

(65) Prior Publication Data
US 2023/0168424 A1 Jun. 1, 2023

(30) Foreign Application Priority Data
Nov. 29, 2021 (CN) .......................... 202111429012.2

(51) Int. Cl.
F21V 8/00 (2006.01)

(52) U.S. Cl.
CPC ......... *G02B 6/0055* (2013.01); *G02B 6/0038* (2013.01); *G02B 6/0065* (2013.01)

(58) Field of Classification Search
CPC ................ G02B 6/0055; G02B 6/0065; G02F 1/133605
See application file for complete search history.

(56) References Cited

FOREIGN PATENT DOCUMENTS

| CN | 202615113 U | 12/2012 |
| CN | 107065292 A | 8/2017 |

(Continued)

OTHER PUBLICATIONS

Chinese Office Action issued in corresponding Chinese Patent Application No. 202111429012.2 dated Oct. 18, 2023, pp. 1-7.

*Primary Examiner* — Karabi Guharay
(74) *Attorney, Agent, or Firm* — Mark M. Friedman (57) ABSTRACT

A production method of a backlight plate, a backlight plate and a backlight module are provided. The method includes providing a light-transmitting substrate which comprises a first area and a second area, forming a pad on the light-transmitting underlay substrate corresponding to the first area, coating a layer of photosensitive material on the light-transmitting substrate and the pad to form a reflective layer, exposing a position of the second area at opposite sides of the light-transmitting substrate that the reflective layer corresponds to, and developing the reflective layer to form a groove for exposing the pad on the first area that the reflective layer corresponds to. The present disclosure ensures the stability of the reflective layer and enhances the overall reflectance of the backlight plate.

19 Claims, 4 Drawing Sheets

(56) References Cited

FOREIGN PATENT DOCUMENTS

| | | | |
|---|---|---|---|
| CN | 111505868 A | 8/2020 | |
| CN | 111752041 A | 10/2020 | |
| CN | 112241088 A | 1/2021 | |
| CN | 112467018 A | 3/2021 | |
| CN | 112882280 A | 6/2021 | |
| CN | 113126363 A | 7/2021 | |
| CN | 113270437 A | 8/2021 | |
| JP | H08184820 A | 7/1996 | |
| JP | H1184633 A | 3/1999 | |
| JP | 2011165434 A | 8/2011 | |
| KR | 101780793 B1 * | 9/2017 | ............ H01L 33/46 |
| KR | 101780793 B1 | 9/2017 | |

\* cited by examiner

FIG. 11

PRODUCTION METHOD OF BACKLIGHT PLATE, BACKLIGHT PLATE, AND BACKLIGHT MODULE

CROSS REFERENCE OF RELATED APPLICATION

This application is a US national phase application based upon an International Application No. PCT/CN2021/137052, filed on Dec. 10, 2021, which claims the priority of Chinese Patent Application No. 202111429012.2, entitled "Production Method of Backlight Plate, Backlight Plate, and Backlight Module", filed on Nov. 29, 2021, the disclosures of which are incorporated herein by reference in its entirety.

BACKGROUND

1. Field of the Disclosure

The present disclosure relates to the field of display technology, and more particularly, to a production method of a backlight plate, a backlight plate, and a backlight module.

2. Description of the Related Art

With the development of display technology, a reflective layer is used on the surface of a backing plate of a backlight plate to increase display brightness and a method of exposure development is adopted to form a window to expose a pad on the backing plate in mini light-emitting diode (Mini-LED) display technology. However, the reflective layer is prone to undercut, resulting in lower reflectance of the backlight plate in the related art.

SUMMARY

The preferred embodiment of the present disclosure proposes a production method of a backlight plate, a backlight plate, and a backlight module to solve the problem that the reflectance of a backlight plate of the related art is comparatively low due to frequent undercut of a reflective layer of the related art easily.

According to an embodiment of the present disclosure, a production method of a backlight plate includes: proposing a light-transmitting substrate which comprises a first area and a second area; forming a pad on the light-transmitting underlay substrate corresponding to the first area; coating a layer of photosensitive material on the light-transmitting substrate and the pad to form a reflective layer; exposing a position of the second area at opposite sides of the light-transmitting substrate that the reflective layer corresponds to; and developing the reflective layer to form a groove for exposing the pad on the first area that the reflective layer corresponds to.

Optionally, the exposing the position of the second area at the opposite sides of the light-transmitting substrate that the reflective layer corresponds to comprises: exposing, with a first exposure intensity, a position of the reflective layer corresponding to the second area away from the light-transmitting substrate; exposing, with a second exposure intensity greater than the first exposure intensity, an area of the light-transmitting substrate that the reflective layer corresponds to the second area away from the reflective layer.

Optionally, the first exposure intensity is greater than or equal to 300 milli Joule (mJ); the first exposure intensity is less than or equal to 800 mJ; and/or the second exposure intensity is greater than or equal to 300 mJ; the second exposure intensity is less than or equal to 800 mJ.

Optionally, the exposing the position of the second area at the opposite sides of the light-transmitting substrate that the reflective layer corresponds to comprises: exposing a position of the reflective layer corresponding to the second area away from the light-transmitting underlay substrate for a first predetermined duration; exposing an area of the light-transmitting underlay substrate that the reflective layer corresponds to the second area away from the reflective layer 130 for a second predetermined duration; the second predetermined duration being greater than the first predetermined duration.

Optionally, the exposing a position of the second area at opposite sides of the light-transmitting substrate that the reflective layer corresponds to comprises: exposing a position on the second area that the reflective layer corresponds to while the area on the second area that one side of the reflective layer away from the light-transmitting underlay substrate corresponds to and the area on the second area that the reflective layer away from one side of the light-transmitting underlay substrate corresponds to are exposed.

Optionally, the light transmission of the first area of the light-transmitting underlay substrate is less than that of the second area of the light-transmitting underlay substrate.

Optionally, the proposing the light-transmitting underlay substrate comprises: providing a light-transmitting substrate; disposing a light-shielding layer on a side of a light-shielding area of the light-transmitting substrate to form a light-transmitting underlay substrate; the light-shielding area being defined as a first area; or disposing the light-shielding layer at opposite sides of the light-shielding area of the light-transmitting substrate to form a light-transmitting underlay substrate; the light-shielding area being defined as the first area.

Optionally, the forming the pad on the light-transmitting underlay substrate corresponding to the first area comprises: forming a metal layer on the light-transmitting substrate; etching a position of the second area that the metal layer corresponds to form the pad on a position of the first area that the light-transmitting underlay substrate corresponds to.

Optionally, the thickness of the reflective layer is less than or equal to 70 micrometers ($\mu m$).

Optionally, a gap is arranged between a side wall of the groove on the reflective layer and the pad of the backlight plate; the gap is less than or equal to 30 $\mu m$.

Optionally, the pad and an area that the gap corresponds to is the first area.

Optionally, the method further comprises: connecting a light plate to the pad.

According to another embodiment of the present disclosure, a backlight plate comprises: a light-transmitting underlay substrate, comprising a first area and a second area; a pad, disposed on a position of the first area that the light-transmitting underlay substrate corresponds to; a reflective plate, disposed on the light-transmitting underlay substrate; a groove being disposed on a position of the pad that the reflective layer corresponds to; the groove exposing the pad.

Optionally, the backlight plate comprises the plurality of pads; the plurality of pads are disposed at intervals; the groove exposes the plurality of pads.

Optionally, the backlight plate comprises the plurality of pads; the plurality of grooves are disposed on the reflective layer; the plurality of grooves correspond to the plurality of pads one on one.

Optionally, a side wall of the groove is vertical to the light-transmitting underlay substrate.

Optionally, the light-transmitting underlay substrate comprises a light-transmitting substrate and a light-shielding layer; the light-transmitting substrate comprises a light-shielding area; the light-shielding layer is disposed on a side of the light-shielding layer; the light-shielding layer is defined as the first area.

Optionally, the light-shielding layer is disposed at opposite sides of the light-shielding area.

Optionally, the backlight plate comprises a light plate; the light plate is connected to the pad.

According to another embodiment of the present disclosure, a backlight module, comprises the above backlight plate.

According to the embodiment of the present disclosure, a light-transmitting underlay substrate is a carrier substrate with function of light transmission is provided. A reflective layer at opposite sides of the light-transmitting underlay substrate is exposed to increase photo sensibility of each photosensitive molecule in a photosensitive material of the reflective layer, to enhance the bonding among each of the photosensitive molecules, and to avoid undercut because of smaller photo sensibility of each of the photosensitive molecules of the thicker reflective layer, thereby ensuring the stability of the reflective layer and enhancing the overall reflectance of the backlight plate.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

| Reference character | Element |
|---|---|
| 10 | Backlight module |
| 100 | Backlight plate |
| 110 | Light-transmitting underlay substrate |
| 111 | Light-transmitting substrate |
| 112 | Light-shielding layer |
| 120 | Pad |
| 130 | Reflective layer |
| 131 | Groove |
| 132 | Gap |
| 140 | Light plate |
| 200 | Backlight plate |
| 300 | Optical film group |
| S1 | First area |
| S2 | Second area |

DETAILED DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

All of the terminologies containing one or more technical or scientific terminologies have the same meanings that persons skilled in the art understand ordinarily unless they are not defined otherwise. For example, "upper" or "lower" of a first characteristic and a second characteristic may include a direct touch between the first and second characteristics. The first and second characteristics are not directly touched; instead, the first and second characteristics are touched via other characteristics between the first and second characteristics.

A preferred embodiment of the present disclosure proposes a production method of a backlight plate 100. The production method includes blocks as follows: block S100 and block S200, block S300, block S400, and block S500, as shown in FIG. 1 to FIG. 4.

Figure 1:
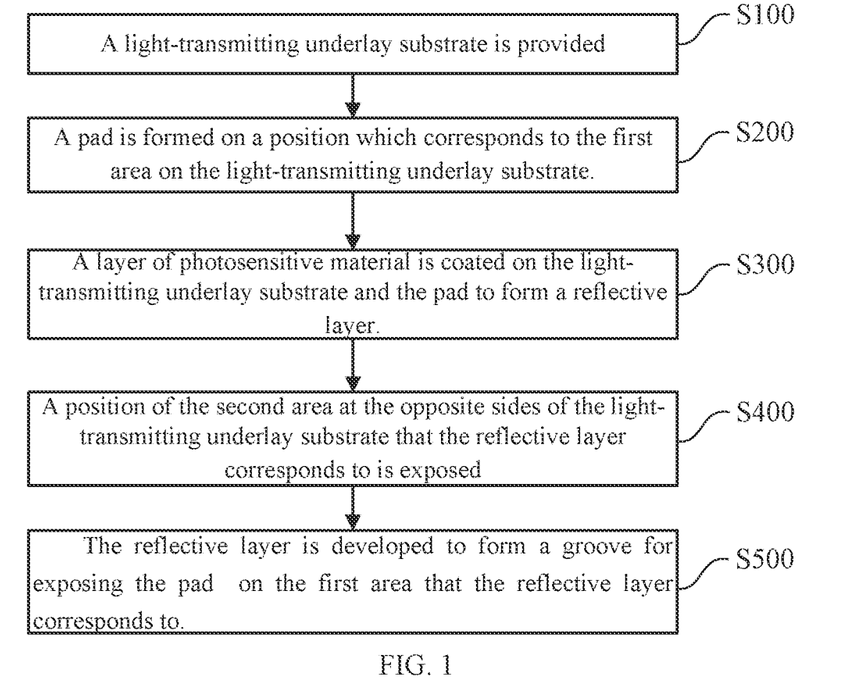
FIG. 1 is a flowchart of a method of producing a backlight plate according to an embodiment of the present disclosure.

At block S100, a light-transmitting underlay substrate 110 is provided. The light-transmitting underlay substrate 110 includes a first area S1 and a second area S2.

The light-transmitting underlay substrate 110 is a carrier substrate with function of light transmission in the embodiment of the present disclosure. On one hand, the light-transmitting underlay substrate 110 is configured to support other structures on the backlight plate 100. On the other hand, the light-transmitting underlay substrate 110 is configured to facilitate the design for the direction of light of the mask process for the backlight plate 100. The production process for the backlight plate 100 is adjusted and designed according to practical demands.

A material for the light-transmitting underlay substrate 110 may be a glass substrate or other composite materials. The material for the substrate in the present disclosure is not confined to specific types as long as the substrate is highly transparent.

Preferably, the light-transmitting underlay substrate 110 includes a first area S1 and a second area S2. The first area S1 and the second area S2 are divided according to the type of the film layer disposed on the light-transmitting underlay substrate 110, the transparency of the light-transmitting underlay substrate 110, or the function of the different areas on the light-transmitting underlay substrate 110. The specific division of the areas on the light-transmitting underlay substrate 110 is adjusted according to practical situations.

The structure of the first area S1 and the second area S2, such as shape, size, and mutual positional relationship, etc., are correspondingly adjusted and designed according to the production process for the backlight plate 100 and the specific structure of the backlight plate 100. In other words, the structure of the first area S1 and the second area S2 in the present disclosure is not confined to specific types.

At block S200, a pad 120 is formed on a position which corresponds to the first area S1 on the light-transmitting underlay substrate 110. It is necessary to form the pad 120 on the light-transmitting underlay substrate 110 after the light-transmitting underlay substrate 110 is divided into different areas so that other structures can be connected to the light-transmitting underlay substrate 110.

The arrangement of the pad 120 in the first area S1 is good to localize the pad 120 so as to precisely connect other structures to the pad 120 afterwards. Besides, the design of the pad 120 is also the basis for the division of the first area S1 on the light-transmitting underlay substrate 110 to facilitate the design of the light-transmitting underlay substrate 110. That is, the specific structure of the pad 120 has a mutually defined relationship between the specific structure of the first area S1 in the light-transmitting underlay substrate 110.

Figure 6:
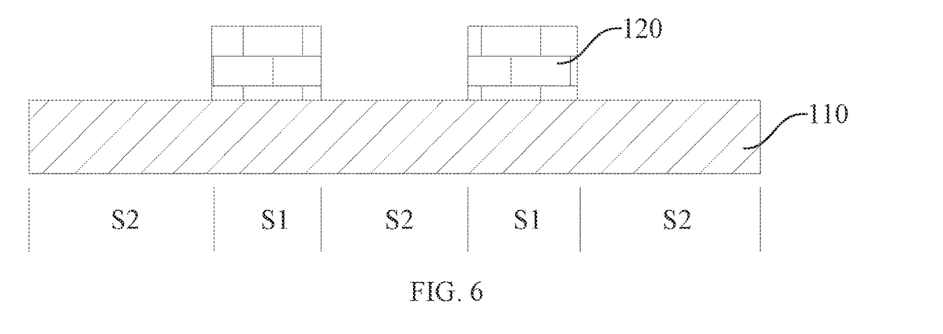
FIG. 6 illustrates a schematic diagram of a backlight plate corresponding to the block S200 illustrated in FIG. 1.

Please refer to FIG. 6. The way of forming the pad 120 on the light-transmitting underlay substrate 110 is that, a metal layer is formed on the light-transmitting underlay substrate 110 followed by the metal layer etched based on the defined patterns of the first area S1 and the second area S2 so as to remove the metal layer in the second area S2 by etching while the metal layer in the first area S1 is saved. At the end, the pad 120 is formed.

At block S300, a layer of photosensitive material is coated on the light-transmitting underlay substrate 110 and the pad 120 to form a reflective layer 130. The second area S2 on the light-transmitting underlay substrate 110 is in the exposed state after the first area S1 on the light-transmitting underlay substrate 110 forms the pad 120. When the light irradiates onto the light-transmitting underlay substrate 110, some of the light penetrates the light-transmitting underlay substrate 110. Because the light-transmitting underlay substrate 110 is light transmissive, the reflectance of the backlight plate 100 is comparatively low.

Figure 7:
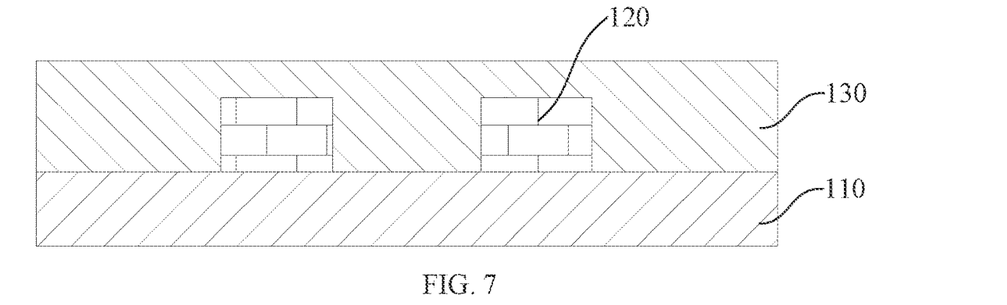
FIG. 7 illustrates a schematic diagram of a backlight plate corresponding to the block S300 illustrated in FIG. 1.

As FIG. 7 illustrates, a layer of photosensitive material is coated on the light-transmitting underlay substrate 110 and the pad 120 to form a reflective layer 130 so that the light irradiating onto the light-transmitting underlay substrate 110 can be reflected, thereby increasing the overall reflectance of the backlight plate 100.

The reflective layer 130 is made of a photosensitive material so the properties of the reflective layer 130 are directly related to the mask conditions. The photosensitive material for the reflective layer 130 facilitates the regulation of the structure of the reflective layer 130 through the regulation of the mask process in the production of the backlight plate 100. Accordingly, a requirement for the structure of the reflective layer 130 is satisfied and further, the reflection effect that the backlight plate 100 has is improved.

At block S400, a position of the second area S2 at the opposite sides of the light-transmitting underlay substrate 110 that the reflective layer 130 corresponds to is exposed. The opposite sides of the light-transmitting underlay substrate 110 refers to one side of the reflective layer 130 away from the light-transmitting underlay substrate 110 and one side of the light-transmitting underlay substrate 110 away from the reflective layer 130.

The photosensitive material for the reflective layer 130 features certain fluidity after the reflective layer 130 is coated, and the bonding between the photosensitive molecules in the photosensitive material is relatively weak, so it is not good for the reflective layer 130 to reflect light. The reflective layer 130 is exposed such that the bonding between the photosensitive molecules in the photosensitive material is gradually enhanced under irradiation of the light to solidify the reflective layer 130 and ensure that the reflectance of the reflective layer 130 is high.

Figure 8:
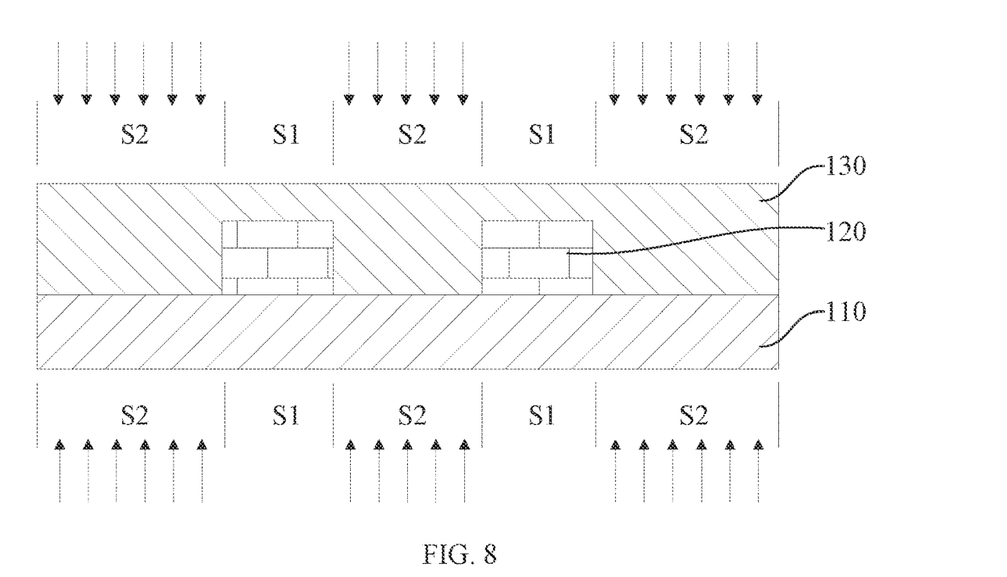
FIG. 8 illustrates a schematic diagram of a backlight plate corresponding to the block S400 illustrated in FIG. 1.

Please refer to FIG. 8. The reflective layer 130 on the opposite sides of the light-transmitting underlay substrate 110 is exposed in the present embodiment because the light-transmitting underlay substrate 110 is characteristic of light transmission to increase photo sensibility in each of the photosensitive molecules in the photosensitive material and then to prevent relatively weak bonding of the photosensitive molecules due to low photo sensibility of the photosensitive molecules in the thicker area of the reflective layer 130, which may negatively affect the stability of the reflective layer 130 and the overall reflectance of the reflective layer 130.

The reflective layer 130 at the opposite sides of the light-transmitting underlay substrate 110 is exposed in the present disclosure. However, the exposure intensity and exposure time used in the exposure process can be adjusted according to the specific structure of the reflective layer 130, which is not particularly limited here.

At block S500, the reflective layer 130 is developed to form a groove 131 for exposing the pad 120 on the first area S1 that the reflective layer 130 corresponds to.

After being formed on the light-transmitting underlay substrate 110 and the pad 120, the reflective layer 130 on the pad 120 needs to be removed to expose the pad 120 so as to facilitate the connection between other structures and the pad 120. In this way, the backlight plate 100 can operates normally.

Since the area where the reflective layer 130 corresponds to the second area S2 is mainly exposed in the exposure process, the photo sensibility of the reflective layer 130 corresponding to the second area S2 is greater than the photo sensibility of the reflective layer 130 corresponding to the first area S1. In other words, the bonding of the photosensitive molecules of the reflective layer 130 corresponding to the second area S2 is greater than the bonding of the photosensitive molecules of the reflective layer 130 corresponding to the first area S1. Thereby, the stability of the reflective layer 130 corresponding to the first area S1 and the stability of the reflective layer 130 corresponding to the second area S2 differ a lot in the same treatment conditions.

Figure 9:
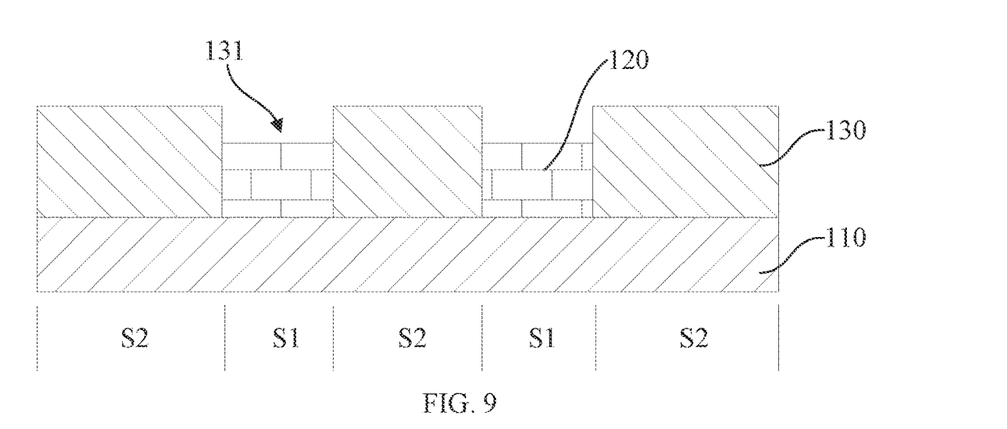
FIG. 9 illustrates a schematic diagram of a backlight plate corresponding to the block S500 illustrated in FIG. 1.

Please refer to FIG. 9. The reflective layer 130 is developed in the embodiment of the present disclosure. The bonding of the photosensitive molecules of the reflective layer 130 corresponding to the first area S1 is worse so the stability of the reflective layer 130 corresponding to the first area S1 is relatively worse. A developer is sprayed on the reflective layer 130, and the reflective layer 130 corresponding to the first area S1 is dissolved in the developer while the reflective layer 130 corresponding to the second area S2 keeps relatively stable; thereby, a groove 131 is formed in the position of the reflective layer 130 corresponding to the first area S1. The pad 120 is formed in the first area S1 on the light-transmitting underlay substrate 110 so the groove 131 can be exposed to expose the pad 120 by the developing process, thereby facilitating the connection between other structures and the pad 120.

The light-transmitting underlay substrate 110 featuring light transmission is taken as a carrier substrate in the production method for the backlight plate 100 in the embodiment of the present disclosure. The reflective layer 130 at both opposite sides of the light-transmitting underlay substrate 110 is exposed to increase photo sensibility of the photosensitive molecules in the photosensitive material of the reflective layer 130 and the bonding of each of the photosensitive molecules and prevent undercut due to lower photo sensibility of some of the photosensitive molecules of the reflective layer 130 with greater thickness, thereby ensuring the stability of the reflective layer 130 and increasing the overall reflectance of the backlight plate 100.

Figure 2:
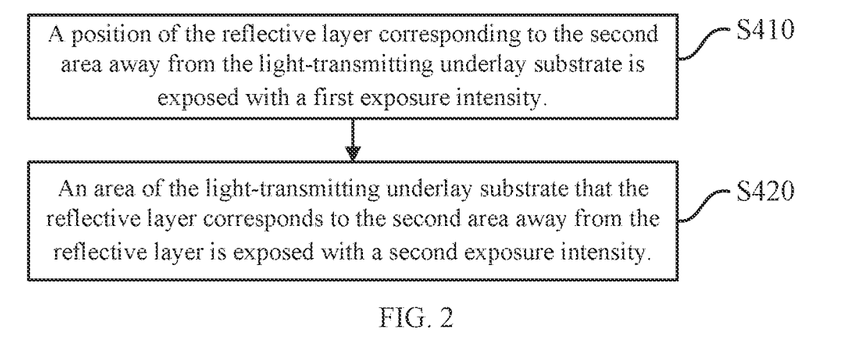
FIG. 2 is a flowchart of the block S400 illustrated in FIG. 1.

As illustrated in FIG. 2, the block S400 of exposing the position on the second area S2 that the reflective layer 130 corresponds to further includes block S410 and block S420.

At block S410, away from the light-transmitting underlay substrate 110, a position of the reflective layer 130 corresponding to the second area S2 is exposed with a first exposure intensity.

At block S420, away from the reflective layer 130, an area of the light-transmitting underlay substrate 110 that the reflective layer 130 corresponds to the second area S2 is exposed with a second exposure intensity. The second exposure intensity is greater than the first exposure intensity.

Away from the reflective layer 130, an area of the light-transmitting underlay substrate 110 that the reflective layer 130 corresponds to the second area S2 is exposed. When the light irradiates onto the area that the reflective layer 130 corresponds to, the reflective layer 130 not only contains sufficient photo sensibility in a certain range of the thickness but also keeps itself from being damaged by adjusting the first exposure intensity.

The light needs to penetrate the light-transmitting underlay substrate 110 before the area of the light-transmitting underlay substrate 110 that the reflective layer 130 corresponds to the second area S2 is exposed away from the reflective layer 130. Although the light-transmitting underlay substrate 110 is characteristic of light transmission, some energy still loses when the light penetrates the light-transmitting underlay substrate 110. The photo sensibility of one side of the reflective layer 130 near the light-transmitting underlay substrate 110 is less than photo sensibility of one side of the reflective layer 130 away from the light-transmitting underlay substrate 110 with the same exposure intensity. Therefore, there is a difference in performance for different areas of the reflective layer 130.

The reflective layer 130 is exposed under the condition that the second exposure intensity is greater than the first exposure intensity to make up the energy loss when the light penetrates the light-transmitting underlay substrate 110 and to balance the exposure effect on both sides of the reflective layer 130, thereby improving the structural unity of the reflective layer 130 In the present embodiment.

Preferably, to ensure that each photosensitive molecule of the photosensitive material of the reflective layer 130 near the light-transmitting underlay substrate 110 has sufficient photo sensibility, the first exposure intensity is controlled to be greater than or equal to 300 milli Joule (mJ) to meet the demand of photosensitive molecules in photosensitive materials for photo sensibility. If the first exposure intensity is too large, the organic ingredients in the photosensitive material may be decomposed or damaged due to excessive light energy. As a result, the reflective layer 130 is structurally destroyed, and the reflection effect of the reflective layer 130 is affected. Due to these reasons, the first exposure intensity is controlled to be less than or equal to 800 mJ.

In the practical production process, the first exposure intensity may be 300 mJ, 400 mJ, 500 mJ, 600 mJ or 800 mJ, etc. The first exposure intensity can be correspondingly adjusted and designed according to the practical situations, which is not confined here as long as photo sensibility of the photosensitive material on the position which the reflective layer 130 corresponds to is sufficient to prevent the reflective layer 130 from being damaged due too much exposure intensity.

To ensure that each photosensitive molecule of the photosensitive material of the reflective layer 130 near the light-transmitting underlay substrate 110 has sufficient photo sensibility, the second exposure intensity is controlled to be greater than or equal to 300 mJ to meet the demand of photosensitive molecules in photosensitive materials for photo sensibility. To prevent the reflective layer 130 from being damaged by too much exposure intensity, the second exposure intensity is controlled to be less than or equal to 800 mJ.

In the practical production process, the second exposure intensity may be 300 mJ, 400 mJ, 500 mJ, 600 mJ or 800 mJ, etc. The second exposure intensity can be correspondingly adjusted and designed according to the practical situations, which is not confined here as long as photo sensibility of the photosensitive material on the position which the reflective layer 130 corresponds to is sufficient to prevent the reflective layer 130 from being damaged due too much exposure intensity.

The second exposure intensity needs to be designed to be greater than the first exposure intensity to ensure similar exposure effects on both sides of the reflective layer 130. Practically, the first exposure intensity is set as 300 mJ and the second exposure intensity is set as 450 mJ, the first exposure intensity is set as 450 mJ and the second exposure intensity is set as 550 mJ, or the first exposure intensity is set as 600 mJ and the second exposure intensity is set as 650 mJ. The specific size and the difference between the first exposure intensity and the second exposure intensity can be adjusted according to the production requirements, light transmission of the light-transmitting underlay substrate 110, and energy loss of light in the light-transmitting underlay substrate 110, which is not limited here.

Figure 3:
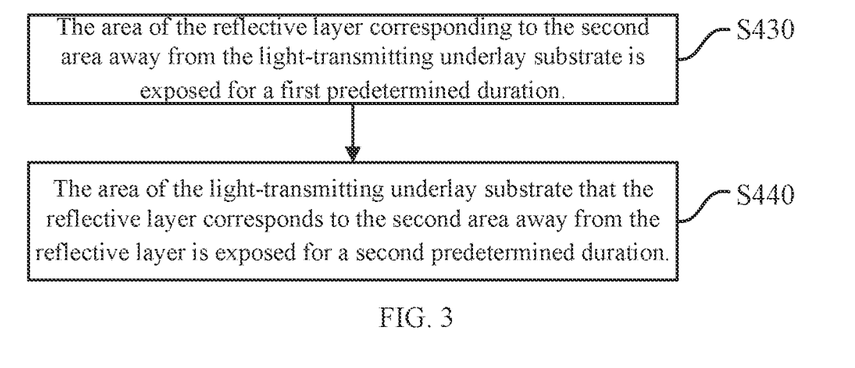
FIG. 3 is another flowchart of the block S400 illustrated in FIG. 1.

Please refer to FIG. 3. The block S400 of exposing the area on the second area S2 that the reflective layer 130 corresponds to further includes block S430 and block S440.

At block S430, away from the light-transmitting underlay substrate 110, the area of the reflective layer 130 corresponding to the second area S2 is exposed for a first predetermined duration.

At block S440, away from the reflective layer 130, the area of the light-transmitting underlay substrate 110 that the reflective layer 130 corresponds to the second area S2 is exposed for a second predetermined duration. The second predetermined duration is greater than the first predetermined duration.

Some energy definitely loses when the exposed light penetrates the light-transmitting underlay substrate 110. To shorten the difference of the exposure effect on the opposite sides of the reflective layer 130, the amount of the first exposure intensity and the second exposure intensity is adjusted. In addition, the exposure time for the opposite sides of the reflective layer 130 is correspondingly adjusted to improve the homogeneity of the structure of the reflective layer 130.

Preferably, the second predetermined duration is greater than the first predetermined duration in the present embodiment to increase the duration for exposure the side of the light-transmitting underlay substrate 110 away from the reflective layer 130 and photo sensibility of the side of the reflective layer 130 near the light-transmitting underlay substrate 110 so as to maintain the amount of photo sensibility on both sides of the reflective layer 130 in the same exposure intensity, thereby improving the homogeneity of the structure of the reflective layer 130.

The first predetermined duration, the second predetermined duration, and the difference between the first predetermined duration, and the second predetermined duration can be adjusted correspondingly according to practical need, light transmission of the light-transmitting underlay substrate 110, and energy loss while the light penetrates the light-transmitting underlay substrate 110, which is not particularly limited here.

Preferably, before the area on the second area S2 that the reflective layer 130 corresponds to is exposed, the area on the second area S2 that one side of the reflective layer 130 away from the light-transmitting underlay substrate 110 corresponds to is exposed, or the area on the second area S2 that the reflective layer 130 away from one side of the light-transmitting underlay substrate 110 corresponds to is exposed. Or, the area on the second area S2 that the reflective layer 130 corresponds to is exposed while the area on the second area S2 that one side of the reflective layer 130 away from the light-transmitting underlay substrate 110 corresponds to and the area on the second area S2 that the reflective layer 130 away from one side of the light-transmitting underlay substrate 110 corresponds to are exposed.

When the area on the second area S2 that the reflective layer 130 corresponds to is exposed, photo sensibility of the photosensitive material of the reflective layer 130 near the exposed side is greater and the bonding of the corresponding photosensitive material is stronger. If the thickness of the reflective layer 130 is larger, photo sensibility of the photosensitive material of the reflective layer 130 away from the exposed side is relatively less, the bonding of the corresponding photosensitive material is weaker, and even effective bonding and solidarity fail.

At this time, the area on the second area S2 that another side of the reflective layer 130 corresponds to is exposed, the photosensitive material with weaker bonding or ineffective bonding maintains bonding and solidarity because of an increase in photo sensibility while the bonding strength between the photosensitive material with weaker bonding or ineffective bonding and the bonded and solidified photosensitive material becomes weaker; thereby, the boundary line may occur in the reflective layer 130, affecting the stability of the reflective layer 130 overall.

Practically, the area on the second area S2 that one side of the reflective layer 130 away from the light-transmitting underlay substrate 110 corresponds to and the area on the second area S2 that the reflective layer 130 away from one side of the light-transmitting underlay substrate 110 corresponds to are exposed so that the photosensitive material of the reflective layer 130 can be simultaneously bonded and solidified and the bonding strength of the photosensitive material of the reflective layer 130 can be increased, the stability of the entire reflective layer 130 can be ensured, and thereby, the reflection effect of the reflective layer 130 is enhanced.

A mask is produced followed by the exposure process so that the amount of photo sensibility in an upper area of the reflective layer 130 can be greater and the amount of photo sensibility in some areas of the reflective layer 130 can be less. Thereby, there is a difference in the binding of the photosensitive material of the corresponding areas to facilitate the processes such as subsequent development etching.

Preferably, the method of producing a backlight plate 100 includes connecting a light plate 140 to a pad 120. A backlight plate 100 is mainly configured to provide a backlight source to a display device to implement the display device with diverse display screens. It is notified that the light-emitting light source of the backlight plate 100 is primarily the light plate 140 and that the light plate 140 is connected to the pad 120 to fix the light plate 140.

The light plate 140 includes a plurality of lamp strings. The light-emitting conditions of the light plate 140 are adjusted by mutual cooperation and mutual design through color and arrangement of light strings to meet the requirements of the display device for different light sources and to realize the diversity of the display screens of the display device.

The definition of the position of the pad 120 by the division of the first area S1 on the light-transmitting underlay substrate 110 realizes the definition of the arrangement of the light plate 140. Similarly, the setting position of the pad 120 can be adjusted according to the arrangement of the light plate 140 in the production process of the backlight plate 100. Thereby, the division mode of the first area S1 on the light-transmitting underlay substrate 110 is designed to achieve the requirements of light transmission of the backlight plate 100 overall.

In the embodiment of the present disclosure, the light transmission of the first area S1 of the light-transmitting underlay substrate 110 is less than that of the second area S2 of the light-transmitting underlay substrate 110. In other words, light transmission of the light-transmitting underlay substrate 110 at the position corresponding to the pad 120 is less than that at the position corresponding to the reflective layer 130. When the reflective layer 130 is developed, it is necessary to remove the portion of the reflective layer 130 corresponding to the first area S1. That is, the portion of the reflective layer 130 covering the surface of the pad 120 needs to be removed to facilitate the connection between the pad 120 and the light plate 140. The light transmission rate of the first area S1 of the light-transmitting underlay substrate 110 is set to be less than the light transmission rate of the second area S2 so that the light-transmitting underlay substrate 110 can be configured as a mask to expose the reflective layer 130 directly on the side of the light-transmitting underlay substrate 110 away from the reflective layer 130. Thereby, the production process is simplified and the production efficiency is improved as well.

Preferably, the light-transmitting underlay substrate 110 is made of a composite structural material with light transmission. That is, the material with different light transmission rates for the light-transmitting underlay substrate 110 is utilized. Besides, the material with different light transmission rates is composite according to the requirements of division of the first area S1 and the second area S2 so that the light transmission rate of the first area S1 is smaller than the light transmission rate of the second area S2.

At Block S100, the light-transmitting underlay substrate 110 includes some details as follows.

Figure 5:
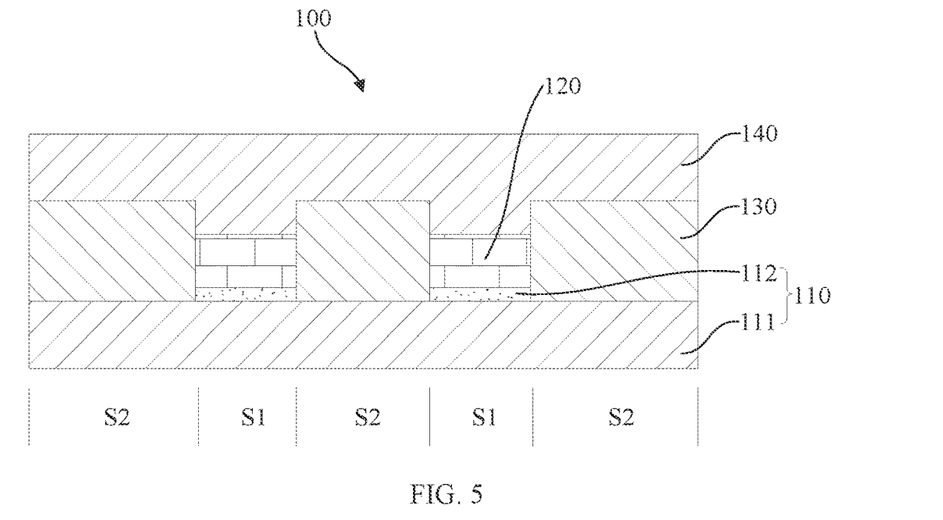
FIG. 5 illustrates a schematic diagram of a backlight plate according to another embodiment of the present disclosure.

Please refer to FIG. 5. Firstly, a light-transmitting substrate 111 is proposed. The light transmission of the light-transmitting substrate 111 is the same everywhere, such as a glass substrate. the light-transmitting substrate 111 is configured to carry other structures in the backlight plate 100. Secondly, a light-shielding layer 112 is arranged on one side of a light-shielding area of the light-transmitting substrate 111 to form a light-transmitting underlay substrate 110. Especially, the light-shielding area is defined as a first area S1 and configured to shield the light in the relative area when one side of the light-transmitting underlay substrate 110 away from the reflective layer 130 is exposed to reduce the transmission rate of the exposed light.

It is notified that, the light-shielding layer 112 proposed by the present embodiment is a film layer having a smaller light transmission or a completely opaque film layer with the light transmission of zero (0). It is only necessary to ensure that the setting of the light-shielding layer 112 can effectively reduce the light transmission rate of the exposure light in the corresponding area. There is no restriction here.

Especially, the light-shielding layer 112 can be arranged on one side of the light-transmitting substrate 111 near the reflective layer 130 or on one side of the light-transmitting substrate 111 away from the reflective layer 130. In other words, the light-shielding layer 112 is arranged on more than one side of the light-transmitting substrate 111, and the light-shielding layer 112 corresponds to the pad 120 to ensure that photo sensibility of the reflective layer 130 above the pad 120 is reduced without affecting photo sensibility of the other parts of the reflective layer 130.

Practically, the position of the pad 120 is determined based on the setting mode of the light-shielding layer 112 or the arrangement requirements of the light plate 140. Afterwards, the division mode of the first area S1 is confined to determine the position of the light-shielding layer 112. The specific setting mode can be adjusted according to the actual demand.

In a preferred embodiment of the present disclosure, a light-shielding layer 112 is arranged on two opposite sides of a light-shielding area of a light-transmitting substrate 111 to form a light-transmitting underlay substrate 110. Especially, the light-shielding area is defined as a first area S1 to ensure photo sensibility of a reflective layer 130 located in a second area S2 and further reduce photo sensibility of the reflective layer 130 located in the first area S1 so that the reflective layer 130 on the pad 120 can be easily dissolved in a developer in the developing process and that the connection between the light plate 140 and the pad 120 can be not affected by the reflective layer 130 which is remained on the pad 120, thereby affecting the luminous effect of a backlight plate 100.

Preferably, the thickness of the reflective layer 130 of the backlight plate 100 is less than or equal to 70 micrometers ($\mu m$). If the thickness of the reflective layer 130 is too large, photo sensibility in the middle part of the reflective layer 130 can be relatively small. The bonding of the corresponding photosensitive material is also relatively low. When the reflective layer 130 is developed, the reflective layer 130 may be developed partially, which may negatively affect the stability of the reflective layer 130 and decrease the reflectance of the reflective layer 130.

In addition, the method of increasing exposure intensity or growth exposure time to increase photo sensibility in the middle part of the reflective layer 130 may cause the other parts of the reflective layer 130 to be damaged and affect the structural stability and reflection effect of the reflective layer 130.

Figure 10:
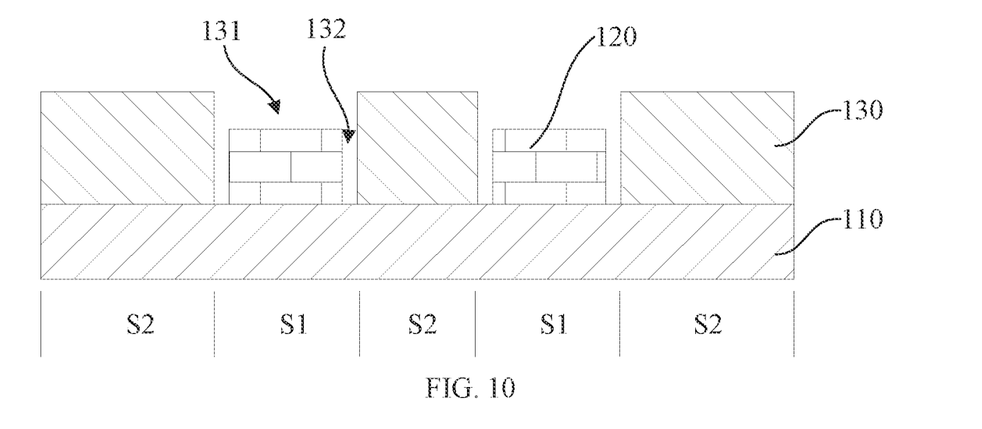
FIG. 10 illustrates another schematic diagram of a backlight plate corresponding to the block S500 illustrated in FIG. 1.

The thickness of the reflective layer 130 is defined as 10 $\mu m$, 30 $\mu m$, 50 $\mu m$, 70 $\mu m$, and so on, to ensure that photo sensibility of the reflective layer 130 exposed on both sides of the light-transmitting underlay substrate 110 is sufficient in a thickness direction, and the bonding of the photosensitive material in the reflective layer 130 is stronger. Accordingly, the structural stability of the reflective layer 130 is ensured, the reflectance of the reflective layer 130 is increased, and the overall display effect of the backlight plate 100 is improved. Preferably, as illustrated in FIG. 10, a gap 132 is arranged between the side wall of the groove 131 on the reflective layer 130 and the pad 120 of the backlight plate 100; that is, the reflective layer 130 and the pad 120 are arranged at intervals on the light-transmitting underlay substrate 110, and the area corresponding to the pad 120 and the gap 132 is the first area S1. This structural arrangement enables the pad 120 to be fully exposed after exposure and development of the reflective layer 130 and prevents the actual size value of the groove 131 from being less than the designing size value due to the difference of exposure effect in the development process; thereby, the undeveloped reflective layer 130 remains on the surface of the pad 120, which is bad for subsequent connection between the pad 120 and the light plate 140.

Preferably, the gap 132 between the side wall of the groove 131 and the pad 120 is less than or equal to 30 micrometers ($\mu m$). It is notified that the size of the gap 132 is directly related to the opening accuracy of the reflective layer 130, and the larger the gap 132 is, the worse the opening accuracy of the reflective layer 130 becomes. If the gap 132 gets larger, the coverage area of the reflective layer 130 on the light-transmitting underlay substrate 110 becomes smaller, and the overall reflectance of the backlight plate 100 becomes smaller as well, thereby affecting the display effect of the backlight plate 100.

In the actual production process, the gap 132 may be 2 $\mu m$, 5 $\mu m$, 10 $\mu m$, 20 $\mu m$, 30 $\mu m$, etc. to prevent the reflective layer 130 from remaining on the pad 120 and to increase the overall reflectance of the backlight plate 100. The value of the gap 132 can be correspondingly adjusted and designed according to the practical situations, which is not confined here.

Further, a backlight plate 100 is proposed by a preferred embodiment of the present disclosure. The backlight plate 100 is produced with a production method as mentioned above. Since all of the technical solutions of all of the above embodiments are employed in the backlight plate 100, more than one of all of the preferred effects of the technical solutions of the embodiments are brought. No more detail is provided.

Figure 4:
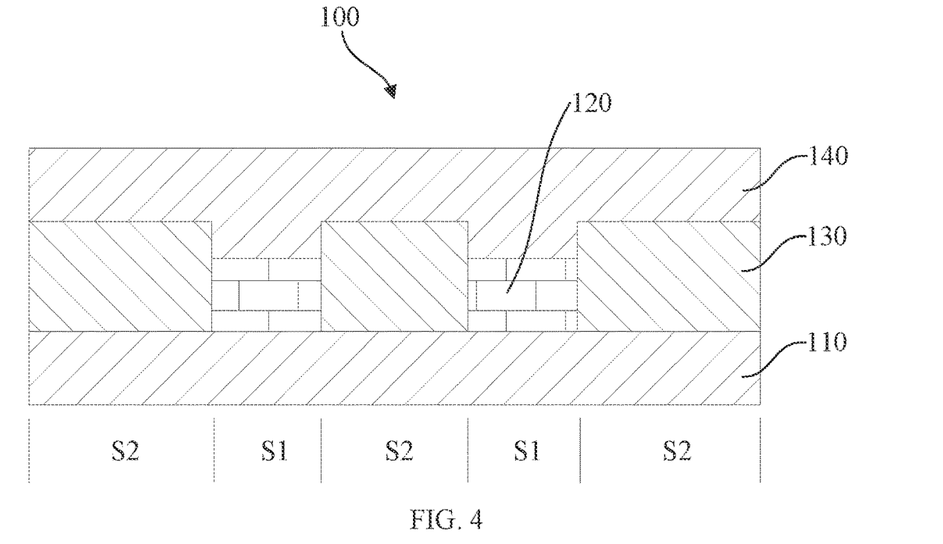
FIG. 4 illustrates a schematic diagram of a backlight plate according to an embodiment of the present disclosure.

Please refer to FIG. 4. The backlight plate 100 includes a light-transmitting underlay substrate 110, a pad 120, a reflective layer 130, and a light plate 140. The light-transmitting underlay substrate 110, the pad 120, the reflective layer 130, and the light plate 140 are sequentially disposed. Especially, the light-transmitting underlay substrate 110 includes a first area S1 and a second area S2. The pad 120 is disposed at a position corresponding to the first area S1, and the reflective layer 130 is disposed at a position corresponding to the second area S2. The light plate 140 is connected to the pad 120 to fix the light plate 140. By regulating the division mode of the first area S1 and the second area S2, the adjustment of the pad 120 is completed, and the adjustment of the arrangement of the light plate 140 is completed as well to meet luminescent requirements of the backlight plate 100.

Preferably, a groove 131 is disposed on the reflective layer 130 corresponding to the pad 120, and the groove 131 exposes the pad 120 to facilitate subsequent connection between the pad 120 and the light plate 140. Especially, the plurality of pads 120 are disposed at intervals on the light-transmitting underlay substrate 110 to facilitate the connection between the plurality of pads 120 and the light plate 140 to regulate the arrangement of the light plate 140 to meet different display requirements of the backlight plate 100.

In a preferable embodiment of the present disclosure, a groove 131 is disposed on a reflective layer 130. The groove 131 exposes a plurality of pads 120. In other words, the reflective layer 130 is not disposed between the two of the adjacent pads 120. Such a structure is designed to facilitate the simultaneous connection between a light plate 140 and the plurality of pads 120 to regulate the luminescent mode of the light plate 140.

In another preferable embodiment of the present disclosure, a plurality of grooves 131 are disposed on a reflective layer 130, and the plurality of grooves 131 correspond to a plurality of pads 120 one on one. That is, the reflective layer 130 is filled between the two of the adjacent pads 120 to separate the plurality of pads 120 separately. Such a structure is designed to avoid the interference between light plates 140 connected to the different pads 120, thereby ensuring the luminescent effect of a backlight plate 100.

The reflective layer 130 at the opposite sides of the light-transmitting underlay substrate 110 is exposed in the production of the backlight plate 100 to ensure that photo sensibility of the reflective layer 130 on the second area S2 is compensated in a thickness direction, and the bonding of the photosensitive material in the reflective layer 130 is stronger. It is not easy to remove the reflective layer 130 corresponding to the second area S2 in the development process, so that undercut does not appear to the reflective layer 130 corresponding to the second area S2. The side wall of the groove 130 on the reflective layer 130 is vertical or close to the light-transmitting underlay substrate 110. In other words, the inclination of the side wall of the groove 131 on the reflective layer 130 relative to the surface of the light-transmitting underlay substrate 110 is smaller. So no gap exists between the side wall of the reflective layer 130 and the light-transmitting underlay substrate 110, thereby increasing the overall reflectance of the reflective layer 130.

Further, a backlight module 10 is proposed by a preferred embodiment of the present disclosure. The backlight module 10 includes a backlight plate 100. The backlight plate 100 is produced with a production method as mentioned above. Since all of the technical solutions of all of the above embodiments are employed in the backlight plate 100, more than one of all of the preferred effects of the technical solutions of the embodiments are brought. No more detail is provided.

Figure 11:
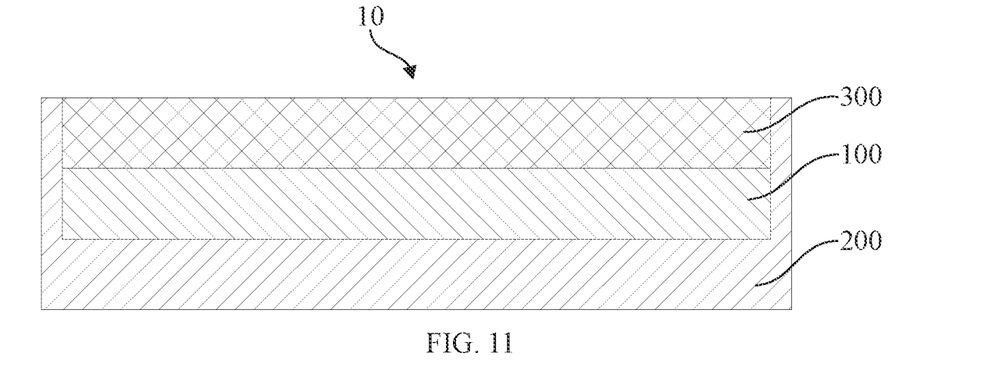
FIG. 11 illustrates a schematic diagram of a backlight plate according to still another embodiment of the present disclosure.

Please refer to FIG. 11. A backlight module 10 includes a backing plate 200, a backlight plate 100, and an optical film group 300. The backlight plate 100 is disposed on the backing plate 200, and the optical diaphragm set 300 is laminated on the backlight plate 100. Especially, a plurality of backlight plates 100 can be disposed on the backing plate 200 with the method of splicing to prevent the area of a single backlight plate 100 from getting too large, which is good for reducing the difficulty of the production process.

A positioning groove may be arranged on the backing plate 200, and the backlight plate 100 and the optical film set 300 are disposed in the positioning groove. The positioning groove is good for defining the position of the backing plate 200 and the optical film set 300 and facilitating the assembly of the backlight module 10.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A production method of a backlight plate, comprising:
   providing a light-transmitting underlay substrate which comprises a first area and a second area, wherein the light transmission of the first area of the light-transmitting underlay substrate is less than that of the second area of the light-transmitting underlay substrate;
   forming a pad on the light-transmitting underlay substrate corresponding to the first area;
   coating a layer of photosensitive material on the light-transmitting underlay substrate and the pad to form a reflective layer;
   exposing a position of the second area at opposite sides of the light-transmitting underlay substrate that the reflective layer corresponds to; and
   developing the reflective layer to form a groove for exposing the pad on the first area that the reflective layer corresponds to.

2. The production method according to claim 1, wherein the exposing the position of the second area at the opposite sides of the light-transmitting underlay substrate that the reflective layer corresponds to comprises:
   exposing, with a first exposure intensity, a position of the reflective layer corresponding to the second area away from the light-transmitting underlay substrate;
   exposing, with a second exposure intensity greater than the first exposure intensity, an area of the light-transmitting underlay substrate that the reflective layer corresponds to the second area away from the reflective layer.

3. The production method according to claim 2, wherein the first exposure intensity is greater than or equal to 300 milli Joule (mJ); the first exposure intensity is less than or equal to 800 mJ; and/or
   the second exposure intensity is greater than or equal to 300 mJ; the second exposure intensity is less than or equal to 800 mJ.

4. The production method according to claim 1, wherein the exposing the position of the second area at the opposite sides of the light-transmitting underlay substrate that the reflective layer corresponds to comprises blocks of:
   exposing a position of the reflective layer corresponding to the second area away from the light-transmitting underlay substrate for a first predetermined duration;
   exposing an area of the light-transmitting underlay substrate that the reflective layer corresponds to the second area away from the reflective layer for a second predetermined duration; the second predetermined duration being greater than the first predetermined duration.

5. The production method according to claim 1, wherein the exposing a position of the second area at opposite sides of the light-transmitting underlay substrate that the reflective layer corresponds to comprises blocks of:
   exposing a position on the second area that the reflective layer corresponds to while the area on the second area that one side of the reflective layer away from the light-transmitting underlay substrate corresponds to and the area on the second area that the reflective layer away from one side of the light-transmitting underlay substrate corresponds to are exposed.

6. The production method according to claim 1, wherein the providing the light-transmitting underlay substrate comprises blocks of:

providing a light-transmitting substrate;

disposing a light-shielding layer on a side of a light-shielding area of the light-transmitting substrate to form the light-transmitting underlay substrate; the light-shielding area being defined as a first area; or disposing the light-shielding layer at opposite sides of the light-shielding area of the light-transmitting substrate to form the light-transmitting underlay substrate; the light-shielding area being defined as the first area.

7. The production method according to claim 1, wherein the forming the pad on the light-transmitting underlay substrate corresponding to the first area comprises blocks of:

forming a metal layer on the light-transmitting underlay substrate;

etching a position of the second area that the metal layer corresponds to form the pad on a position of the first area that the light-transmitting underlay substrate corresponds to.

8. The production method according to claim 1, wherein the thickness of the reflective layer is less than or equal to 70 micrometers ($\mu m$).

9. The production method according to claim 1, wherein a gap is arranged between a side wall of the groove on the reflective layer and the pad of the backlight plate; the gap is less than or equal to 30 $\mu m$.

10. The production method according to claim 9, wherein the pad and an area that the gap corresponds to is the first area.

11. The production method according to claim 1, further comprising:

connecting a light plate to the pad.

12. A backlight plate, comprising:

a light-transmitting underlay substrate, comprising a first area and a second area;

a pad, disposed on a position of the first area that the light-transmitting underlay substrate corresponds to;

a reflective plate, disposed on the light-transmitting underlay substrate; a groove being disposed on a position of the pad that the reflective layer corresponds to; the groove exposing the pad, wherein the light transmission of the first area of the light-transmitting underlay substrate is less than that of the second area of the light-transmitting underlay substrate.

13. The backlight plate according to claim 12, wherein the backlight plate comprises the plurality of pads; the plurality of pads are disposed at intervals; the groove exposes the plurality of pads.

14. The backlight plate according to claim 12, wherein the backlight plate comprises the plurality of pads; the plurality of grooves are disposed on the reflective layer; the plurality of grooves correspond to the plurality of pads one on one.

15. The backlight plate according to claim 12, wherein a side wall of the groove is vertical to the light-transmitting underlay substrate.

16. The backlight plate according to claim 12, wherein the light-transmitting underlay substrate comprises a light-transmitting substrate and a light-shielding layer; the light-transmitting substrate comprises a light-shielding area; the light-shielding layer is defined as the first area.

17. The backlight plate according to claim 16, wherein the light-shielding layer is disposed at opposite sides of the light-shielding area.

18. The backlight plate according to claim 12, wherein the backlight plate comprises a light plate; the light plate is connected to the pad.

19. A backlight module, comprising a backlight plate as claimed in claim 12.

* * * * *